United States Patent
Cromer et al.

(10) Patent No.: US 7,490,250 B2
(45) Date of Patent: Feb. 10, 2009

(54) METHOD AND SYSTEM FOR DETECTING A TAMPER EVENT IN A TRUSTED COMPUTING ENVIRONMENT

(75) Inventors: Daryl Carvis Cromer, Apex, NC (US); Joseph Wayne Freeman, Raleigh, NC (US); Steven Dale Goodman, Raleigh, NC (US); Eric Richard Kern, Durham, NC (US); Randall Scott Springfield, Chapel, NC (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 1246 days.

(21) Appl. No.: 10/012,170

(22) Filed: Oct. 26, 2001

(65) Prior Publication Data

US 2003/0084285 A1    May 1, 2003

(51) Int. Cl.
   *H04L 9/32*    (2006.01)
(52) U.S. Cl. .................................................. 713/194
(58) Field of Classification Search ............... 713/2, 713/100, 194; 340/506, 521, 541, 572.1, 340/572.4
   See application file for complete search history.

(56) References Cited

U.S. PATENT DOCUMENTS

| | | | |
|---|---|---|---|
| 4,091,246 A | 5/1978 | Donofrio et al. | |
| 4,099,722 A | 7/1978 | Rodesch et al. | |
| 4,310,754 A | 1/1982 | Check, Jr. | |
| 4,378,551 A | 3/1983 | Drapac | |
| 4,691,350 A | 9/1987 | Kleijne et al. | |
| 4,696,449 A | 9/1987 | Woo et al. | |
| 4,783,801 A | 11/1988 | Kaule | |
| 4,795,893 A | 1/1989 | Ugon | |
| 4,807,284 A | 2/1989 | Kleijne | |
| 4,818,986 A | 4/1989 | Bauman | |
| 4,860,351 A | 8/1989 | Weingart | |
| 4,975,550 A | 12/1990 | Panchisin | |
| 4,985,695 A | 1/1991 | Wilkinson et al. | |
| 5,007,083 A | 4/1991 | Constant | |
| 5,055,827 A * | 10/1991 | Philipp .................... 340/568.4 |
| 5,060,261 A | 10/1991 | Avenier et al. | |
| 5,117,457 A | 5/1992 | Comerford et al. | |
| 5,159,629 A | 10/1992 | Double et al. | |

(Continued)

FOREIGN PATENT DOCUMENTS

EP    524734 A1    1/1993

(Continued)

OTHER PUBLICATIONS

The American Heritage College Dictionary, 200, Houghton Mifflin Company, fourth edition, p. 975.*

*Primary Examiner*—Jacob Lipman
(74) *Attorney, Agent, or Firm*—Sawyer Law Group LLP

(57) ABSTRACT

A method, system and computer readable medium containing programming instructions for detecting a tamper event in a computer system having an embedded security system (ESS), a trusted operating system, and a plurality of devices is disclosed. The method, system and computer readable medium of the present invention provide for receiving a tamper signal in the ESS, and locking the tamper signal in the ESS. According to the method, system and computer readable medium of the present invention, the trusted operating system is capable of detecting the tamper signal in the ESS.

21 Claims, 5 Drawing Sheets

U.S. PATENT DOCUMENTS

| | | |
|---|---|---|
| 5,239,664 A | 8/1993 | Verrier et al. |
| 5,311,450 A | 5/1994 | Ojima |
| 5,349,249 A | 9/1994 | Chiang et al. |
| 5,353,015 A | 10/1994 | Robinson |
| 5,353,350 A | 10/1994 | Unsworth et al. |
| 5,388,156 A | 2/1995 | Blackledge, Jr. et al. |
| 5,389,738 A | 2/1995 | Piosenka et al. |
| 5,397,176 A | 3/1995 | Allen et al. |
| 5,406,630 A | 4/1995 | Piosenka et al. |
| 5,422,953 A | 6/1995 | Fischer |
| 5,450,271 A | 9/1995 | Fukushima et al. |
| 5,469,557 A | 11/1995 | Salt et al. |
| 5,555,156 A | 9/1996 | Decante |
| 5,555,373 A | 9/1996 | Dayan et al. |
| 5,568,611 A | 10/1996 | Khatri et al. |
| 5,574,786 A | 11/1996 | Dayan et al. |
| 5,712,973 A | 1/1998 | Dayan et al. |
| 5,724,260 A | 3/1998 | Klein |
| 5,748,083 A | 5/1998 | Rietkerk |
| 5,778,199 A | 7/1998 | Wanner et al. |
| D396,699 S | 8/1998 | Vackar |
| D397,329 S | 8/1998 | Vackar |
| 5,912,621 A | 6/1999 | Schmidt |
| 5,945,915 A | 8/1999 | Cromer et al. |
| 5,970,227 A | 10/1999 | Dayan et al. |
| 5,998,858 A | 12/1999 | Little et al. |
| 6,021,493 A | 2/2000 | Cromer et al. |
| 6,026,492 A | 2/2000 | Cromer et al. |
| 6,058,481 A | 5/2000 | Kowalski |
| 6,098,171 A | 8/2000 | Johnson et al. |
| 6,105,136 A | 8/2000 | Cromer et al. |
| 6,185,507 B1 | 2/2001 | Huber et al. |
| 6,191,503 B1 | 2/2001 | Kitten et al. |
| 6,201,296 B1 | 3/2001 | Fries et al. |
| 6,218,941 B1 * | 4/2001 | Cromer et al. ............ 340/572.1 |
| 6,510,518 B1 * | 1/2003 | Jaffe et al. ................... 713/168 |
| 2002/0120575 A1 * | 8/2002 | Pearson et al. ................ 705/51 |

FOREIGN PATENT DOCUMENTS

| | | |
|---|---|---|
| GB | 2163577 | 2/1986 |
| WO | WO9114354 | 9/1991 |
| WO | WO9215095 | 9/1992 |

* cited by examiner

METHOD AND SYSTEM FOR DETECTING A TAMPER EVENT IN A TRUSTED COMPUTING ENVIRONMENT

FIELD OF THE INVENTION

The present invention relates generally to computer systems and, more particularly, to providing a trusted and secure computing platform.

BACKGROUND OF THE INVENTION

With the advent of personal computer system use in every day business transactions, the issue of computer security has become critical. Unsecured personal computers inhibit electronic business (e-business) because users are reluctant, justifiably so, to transmit highly personal and sensitive information to system which may be vulnerable to intruders or viruses. While many personal computer (PC) manufacturers have made individual strides towards increasing security by adding "smart cards" or embedded security chips to their new models, the lack of a concerted effort by the PC industry to develop security technology could prevent the evolution of this technology in a consistent and compatible way between manufacturers.

Recognizing this potential risk and the adverse effects it could have on inhibiting electronic commerce, an open alliance between major PC manufacturers was formed to develop and propose a standard that would adopt hardware and software technologies to strengthen security at the platform level. The open alliance, known as the Trusted Computing Platform Alliance (TCPA), has proposed a standard including new hardware, BIOS and operating system specifications so PC manufacturers can provide a more trusted and secure PC platform based on common industry standards, the details of which are provided in the TCPA PC Specific Implementation Specification, 1.00 RC1 (Aug. 16, 2001), hereby incorporated by reference.

FIG. 1 is a block diagram illustrating a trusted platform in accordance with TCPA standards. As is shown, the PC architecture includes a system 10, platform 20, motherboard or planar 30, and trusted building block (TBB) 40. The system 10 includes the platform 20 and all post-boot components 12, including an operating system 14, that comprise the entire entity that performs actions for, or acts on behalf of, a user. The platform 20 presents and receives information to and from the user. The platform 20 includes the motherboard 30 and peripherals 22 attached to motherboard 30.

The motherboard 30 is provided by the manufacturer and includes one or more CPUs 32 and all primary peripheral devices 34, i.e., devices which directly attach to and directly interact with the CPU 32. In addition, the motherboard 30 includes all BIOSes 36 and the TBB 40. The TBB 40 is the center of the trusted platform, and includes a Core Root of Trust for Measurement (CRTM) 42, a Trusted Platform Module (TPM) 44, and a trusted connection 46 of the CRTM 42 and TPM 44 to the motherboard 30.

According to the TCPA specification, the CRTM 42 and the TPM 44 are the only trusted components on the motherboard 30, i.e., they are presumably secure and isolated from tampering by a third party vendor or software. Only the authorized platform manufacturer (or agent thereof) can update or modify code contained therein. The CRTM 42 is the executable component of the TBB 40 that gains control of the platform 20 upon a platform reset. Thus, for all types of platform resets, the CPU 32 always begins executing code with the CRTM's 42 platform initialization code. The trust in the platform is based on the CRTM 42, and trust in all measurements is based on its integrity.

The basic premise underlying the trusted platform is ensuring that untrusted devices or software have not been loaded onto the system. Trust is established during a pre-boot state that is initiated by a platform reset. The platform reset can either be a cold boot (power-on), a hardware reset, or a warm boot typically caused by a user keyboard input. Following a platform reset, the CPU 32 executes code with the CRTM's 42 platform initialization code. The chain of trust begins at the CRTM 42.

In this architecture, the BIOS includes a Boot Block 50 and a POST BIOS 36. The Boot Block 50 and the POST BIOS 36 are independent components and each can be updated independent of the other. The Boot Block 50 is located in the CRTM 42, while the POST BIOS 36 is located outside the TBB 40. Thus, while the manufacturer or a third party supplier may update, modify or maintain the POST BIOS 36, only the manufacturer can modify or update the Boot Block 50. In a variation of the architecture, the entire BIOS is a single entity located entirely within the CRTM 42.

As stated above, the CRTM 42 and TPM 44 are presumptively trusted. Thus, following a platform reset, code in the Boot Block 50 is executed, which measures the entity to which it will transfer control, in this case, the Post BIOS 36. "Measuring an entity" means hashing code in the entity to produce a log of the code, which is then extended into a platform configuration register (PCR) 48 in the TPM 44. The TPM 44 includes a plurality of PCRs 48a, 48b, 48c, and 48d, a portion of which are designated to the pre-boot environment and referred to collectively as boot PCRs 48a. Each boot PCR 48a is dedicated to collecting specific information related to a particular stage of a boot sequence. For example one boot PCR 48a (PCR[0]) stores measurements from the CRTM 42, POST BIOS 36, and all firmware 38 physically bound to the motherboard 30.

Once the POST BIOS 36 has been measured, control is transferred to the POST BIOS 36, which then continues to boot the system by ensuring that hardware devices are functional. Once POST BIOS 36 gains control, it is responsible for measuring any entity to which it will transfer control. As the POST BIOS 36 progresses through the boot sequence, values in the boot PCRs 48a increment whenever an entity is measured.

Upon booting to the operating system (OS) 14, the operating system 14 verifies the trustworthiness of the platform 20 by comparing the values in the boot PCRs 48a with precalculated values known by the operating system 14. If the values match, the operating system 14 is assured of a secure boot and that the platform is trusted. If the values do not match, the operating system 14 is alerted of a possible breach, and the operating system 14 can take measures to reestablish trust.

In FIGS. 2A and 2B, a flowchart illustrating a conventional boot sequence 100 in accordance with the TCPA trust model is presented. The process 100 begins when the platform 20 is reset in step 110, e.g., the computer is powered-up. In step 112, all boot PCRs 48a are reset to zero. Before the code in the Boot Block 50 is executed, the code may be measured, i.e., hashed to produce a log, which is then extended to the appropriate boot PCR 48a, via step 114. Then, in step 116, the code in the Boot Block 50 is run, which passes control over to the POST BIOS 36. Nevertheless, before executing the code in the POST BIOS 36, that code is also hashed and extended to the boot PCR 48a in step 118. Then, in step 120, the code in the POST BIOS 36 is run.

Referring now to FIG. 2B, the process 100 continues at number B. The POST BIOS 36 locates any bootable devices in step 121 by reading each bootable device and attempting to find a valid boot record. When a valid boot record is discovered, the POST BIOS 36 measures the device and extends the value to the boot PCR 48a in step 122. Thereafter, in step 124, the code in the device is run. If this code determines that the boot is not a bootable device in step 126, control is then returned to the POST BIOS 36 to continue the booting sequence, via step 130.

If the device is a bootable device (step 126), an operating system 14 has presumably been booted, and the process 100 continues at number C. This part of the process verifies the trustworthiness of the boot sequence. As explained above, each component is measured, i.e., the code in each device is hashed and extended to the appropriate boot PCR 48a. Thus, the values in the boot PCRs 48 reflect the boot sequence from beginning to end. In step 134, the operating system compares the value in each boot PCR 48a to a precalculated value that reflects a trustworthy boot sequence. The precalculated value is typically calculated by the operating system 14, which is aware of all trusted components.

If the boot PCR 48 values are equal to the precalculated value calculated by the operating system 14 (step 136), the boot sequence finishes in step 138. On the other hand, if the boot PCR 48 values are not equal to the precalculated value calculated by the operating system 14 (step 136), the operating system 14 will initiate operations to restore trust in step 140. The operating system 14 may examine the boot process to determine whether a security breach has occurred, for instance, by launching a virus detection program.

While the TCPA compliant system described above ensures that rogue applications or devices do not contaminate the trusted platform, there is no present protection against a physical intrusion, i.e., an intruder removing the physical casing or cover of the computer system and physically tampering with the system. Typically, most computer systems utilize tamper circuits to detect a tamper event, e.g., removal of the cover. The tamper event triggers a response from the system, such as an alert to the administrator or a shut down during booting. Nevertheless, these measures can be avoided if the intruder boots to a non-system operating system, which can clear any indication that a tamper event occurred.

Accordingly, a need exists for a method and system for detecting a tamper event in a TCPA compliant system. The detection method and system should be secure and private so that a non-TCPA operating system cannot clear the tamper signal. The present invention addresses such a need.

SUMMARY OF THE INVENTION

The present invention provides a method, system and computer readable medium containing programming instructions for detecting a tamper event in a trusted computer system having an embedded security system (ESS), a trusted operating system, and a plurality of devices. The method, system and computer readable medium of the present invention include receiving a tamper signal in the ESS, and locking the tamper signal in the ESS. According to the method, system and computer readable medium of the present invention, the trusted operating system is capable of detecting the tamper signal in the ESS.

Through aspects of the present invention, the tamper signal is locked in a secure, tamper-proof embedded security system. The tamper signal is hashed and extended to one of the plurality of PCRs. Thus, following a boot sequence, the trusted operating system detects the tamper signal by comparing the value of the one PCR to a precalculated value representing a trustworthy boot. Because the tamper signal is locked in the ESS, an intruder or rogue application cannot clear the tamper signal.

DETAILED DESCRIPTION

The present invention relates generally to computer systems and, more particularly, to a method and system for providing a trusted and secure computing platform. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 3:
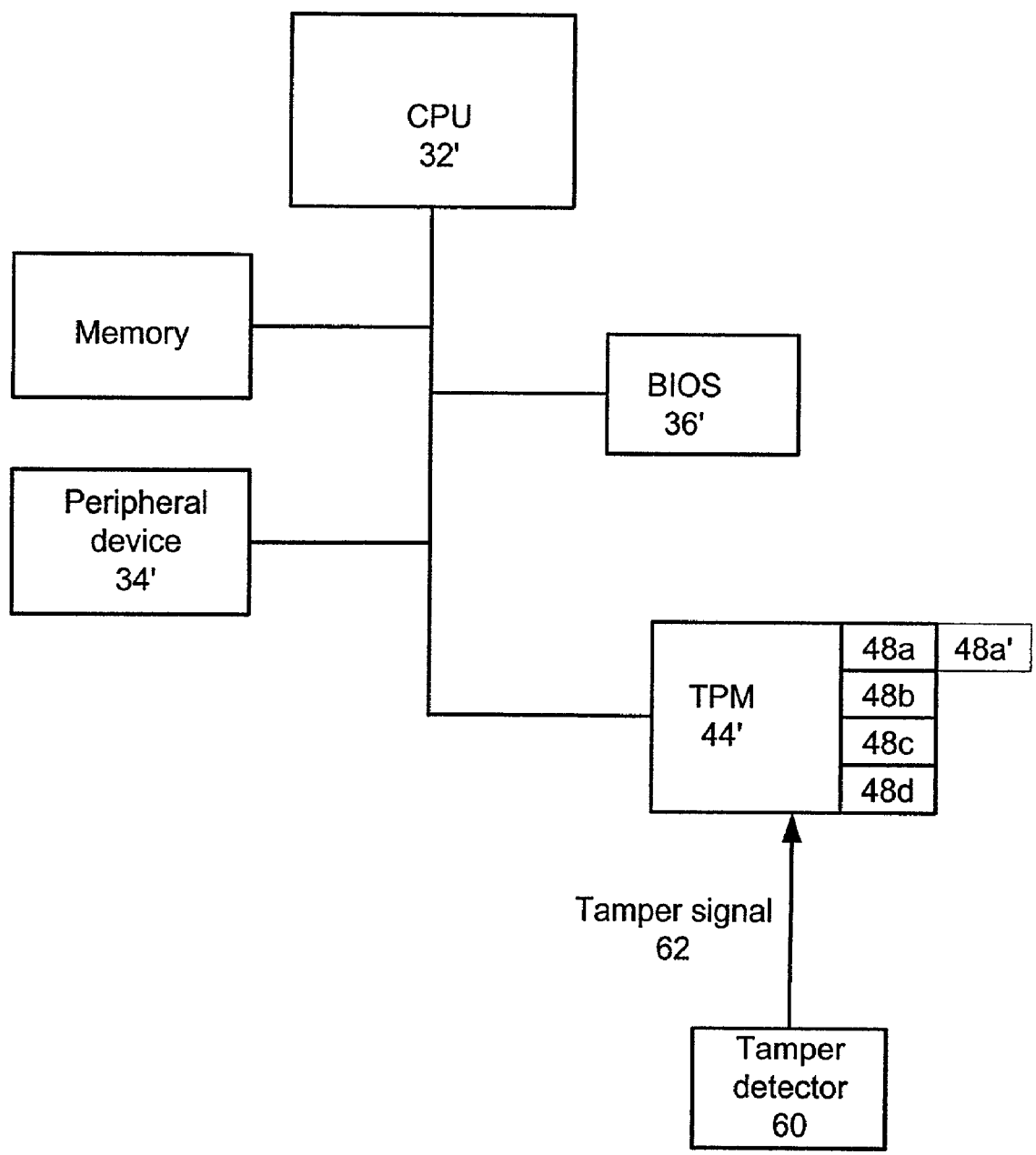
FIG. 3 is a block diagram of a computer system in accordance with the preferred embodiment of the present invention.

FIG. 3 is a block diagram illustrating the computer system according to a preferred embodiment of the method and system of the present invention. The computer system includes a CPU 32' coupled to a peripheral device 34', a BIOS 36', and a TPM 44'. As is shown, a tamper detector 60 is coupled to the TPM 44'. In one embodiment, the tamper detector 60 is a tamper circuit (not shown) including a cover latch that produces an electrical signal when the cover of the computer is removed. In another embodiment, the tamper detector 60 includes an optical sensor to sense light entering the computer system when the cover is removed. While a few examples of the tamper detector 60 are mentioned, one of ordinary skill in the art would readily appreciate that other tamper detection systems exist and are readily available. Such detection systems could be utilized by the method and system of the present invention.

Figure 4:
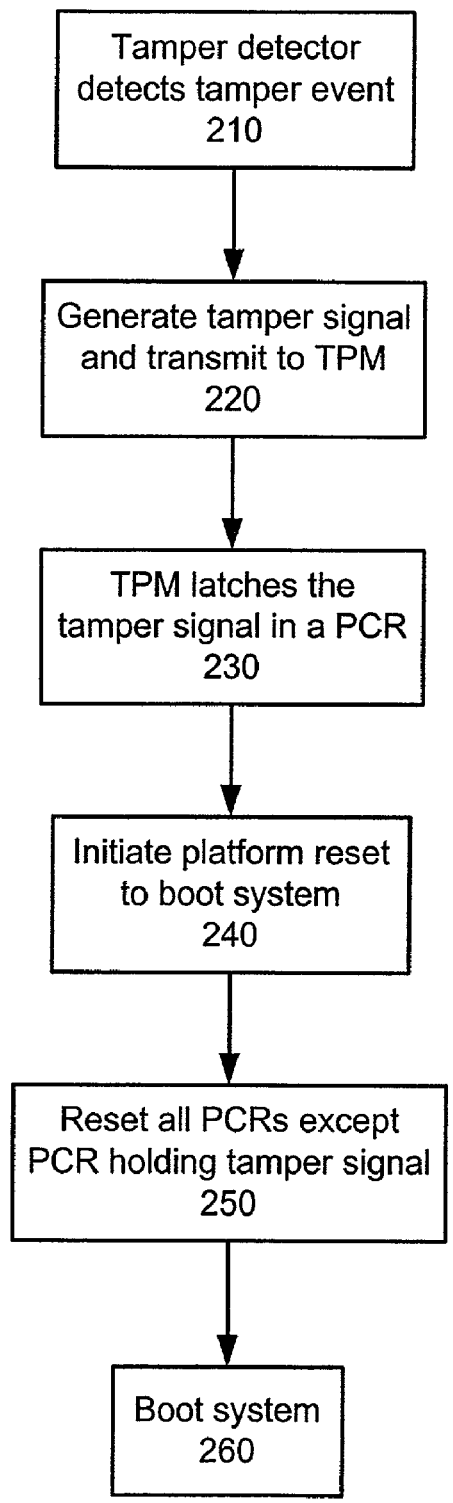
FIG. 4 illustrates a flowchart of a process for detecting a tamper event in accordance with a preferred embodiment of the present invention.

FIG. 4 illustrates a process in accordance with a preferred embodiment of the present invention. The process begins at step 210, where the tamper detector 60 detects a tamper event. In step 220, the tamper detector 60 generates a tamper signal 62, and transmits it to the TPM 44'. The TPM 44' latches the tamper signal 62 by hashing and extending the tamper signal 62 to one of the plurality of boot PCRs 48a', via step 230. Because the tamper signal 62 is latched, the one boot PCR 48a' does not reset to zero when a platform reset is triggered.

Figure 1:
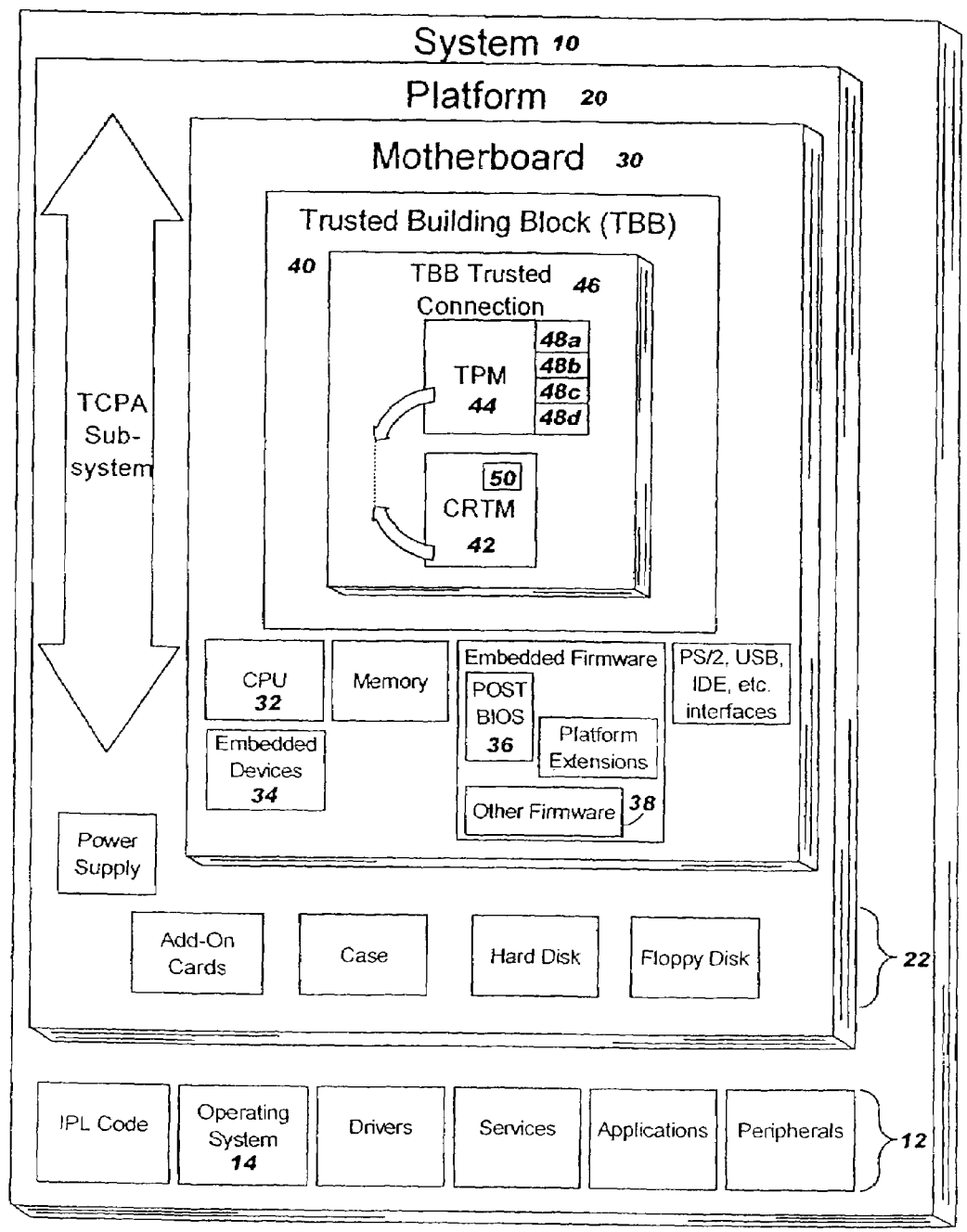
FIG. 1 illustrates a block diagram of a trusted computer system.
Figure 2A:
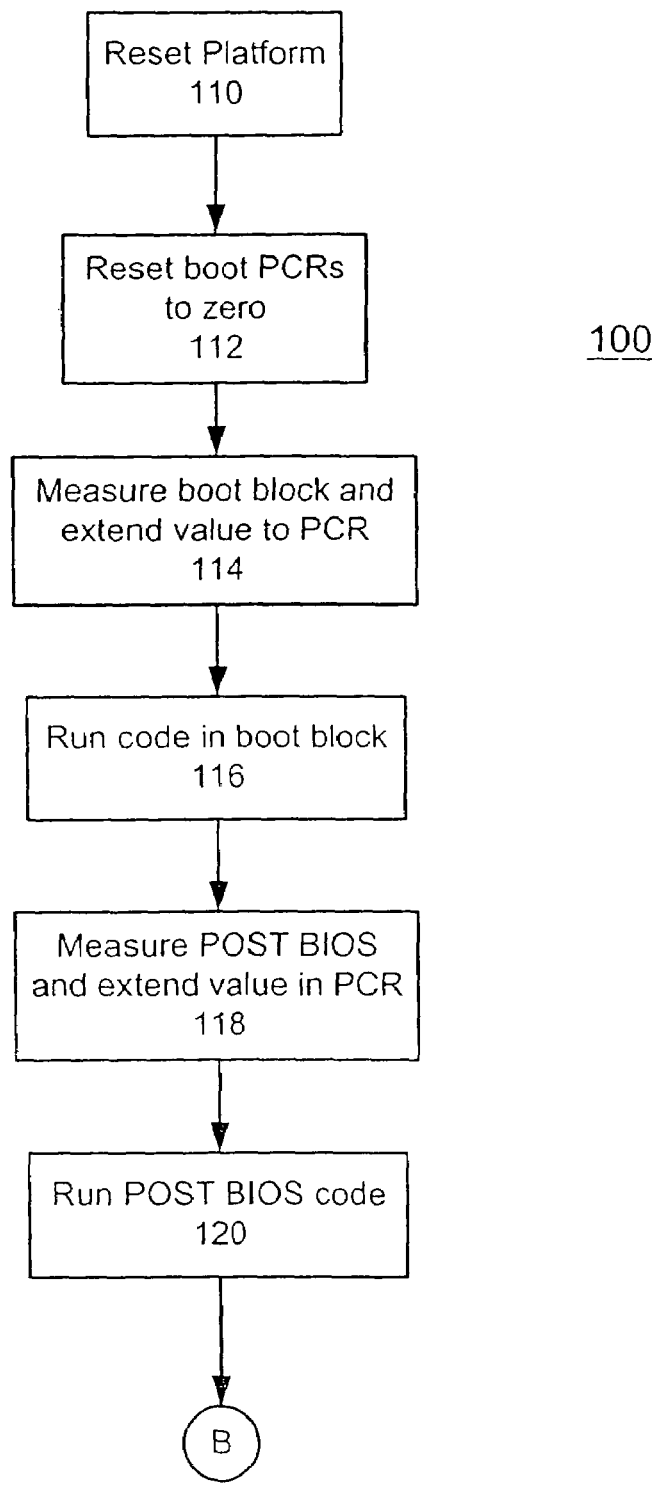
FIGS. 2A and 2B illustrate a flowchart of a process for booting the trusted computer system in accordance with a TCPA trusted model.
Figure 2B:
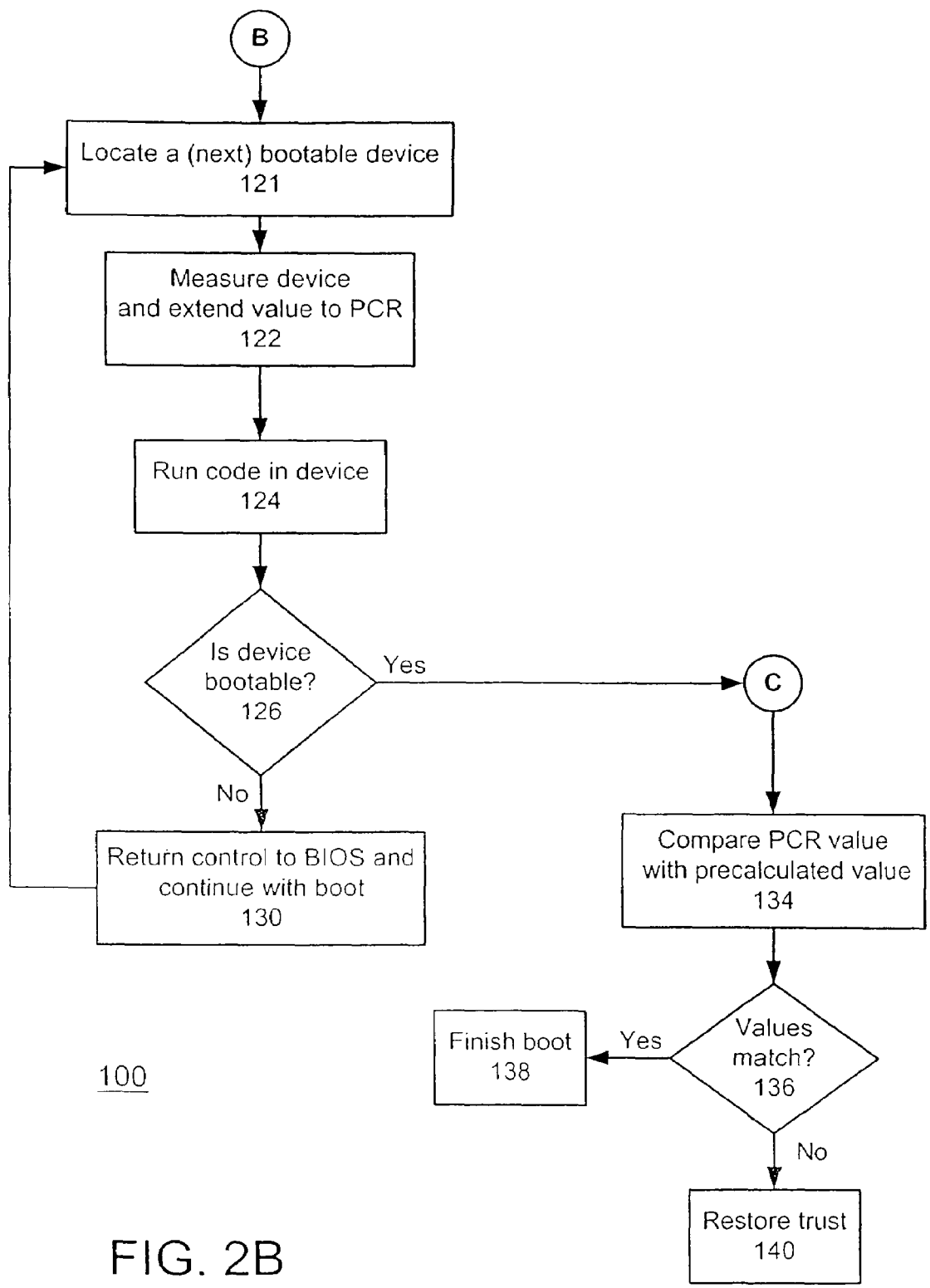

Thus, in step 240, a platform reset is initiated which boots the computer system. As stated above, all of the boot PCRs 48a are reset to zero except the one PCR 48a' that contains the hashed tamper signal 62, via step 250. The normal boot sequence proceeds (via step 260), as illustrated in FIGS. 2A and 2B. After the booting sequence, the trusted operating system 14 compares the boot PCR values 48a to the precalculated value (step 134, FIG. 2B) and concludes that the value in the one PCR 48a' is incongruent, which will prompt the trusted operating system 14 to take measures to restore trust (step 140, FIG. 2B). These measures can include launching a virus protection program, or notifying a system administrator of the tamper event.

Once trust has been restored in the platform, the tamper signal 62 in the TPM 44' is cleared and the one boot PCR 48a' containing the hashed tamper signal 62 is reset to zero. In one preferred embodiment of the present invention, only an authorized entity, e.g., the system administrator or the trusted operating system 14, is allowed to clear the tamper signal 62 in the TPM 44'. This can be accomplished using an encrypted key known only to the authorized entity or by any other means well known to those skilled in the art. Thus, an intruder or rogue software is prevented from clearing the tamper signal 62.

Through the method and system of the present invention, the trusted operating system 14 can detect a tamper event in the computer system. By locking the tamper signal 62 in the TPM 44', the computer system is able to track and record tamper events in a secure and private manner. Thus, the method and system of the present invention enhances security in the TCPA compliant platform.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for detecting tamper events in computer systems, the method comprising the steps of:
   (a) receiving a tamper signal by an embedded security system (ESS) of a computer system;
   (b) locking the tamper signal in the ESS of the computer system; and
   (c) detecting the tamper signal locked in the ESS of the computer system by a trusted operating system of the computer system,
      wherein detection of the tamper signal by the trusted operating system occurs after a BIOS of the computer system progresses through a boot sequence, wherein the ESS of the computer system comprises a Trusted Platform Module (TPM) in accordance with a Trusted Computing Platform Alliance (TCPA) compliant computer system.

2. The method of claim 1, wherein the ESS includes a plurality of platform configuration registers (PCRs) and the locking step (b) further comprises the steps of:
   (b1) latching the tamper signal in the ESS;
   (b2) hashing the tamper signal to produce a tamper value; and
   (b3) extending the tamper value to one PCR of the plurality of PCRs in the ESS.

3. The method of claim 2, wherein the detecting step (c) further comprises the steps of:
   (c1) initiating a platform reset to boot the computer system;
   (c2) resetting all but the one PCRs to zero;
   (c3) hashing code in each device of the plurality of devices booted to produce a measurement value for each device booted;
   (c4) extending the measurement value for each device to an appropriate PCR of the plurality of PCRs; and
   (c5) comparing the measurement value of the one PCR to a precalculated value representing a trustworthy boot.

4. The method of claim 3 further comprising the step of:
   (d) performing preventative operations to restore trust in the computer system if the measurement value of the one PCR is different from the precalculated value.

5. The method of claim 4, wherein the performing step (d) further comprises the step of:
   (d1) executing a virus protection program.

6. The method of claim 4 further comprising the step of:
   (e) resetting the one PCR to zero once trust is established in the computer system.

7. The method of claim 6, wherein the resetting step (e) further includes the step of:
   (e1) providing a secure means for resetting the one PCR, whereby only an authorized entity is capable of resetting the one PCR.

8. A computer readable medium encoded with a computer program for detecting tamper events in computer systems, the computer program comprising programming instructions for:
   (a) receiving a tamper signal by an embedded security system (ESS) of a computer system;
   (b) locking the tamper signal in the ESS of the computer system; and
   (c) detecting the tamper signal locked in the ESS of the computer system by a trusted operating system of the computer system,
      wherein detection of the tamper signal by the trusted operating system occurs after a BIOS of the computer system progresses through a boot sequence, wherein the ESS of the computer system comprises a Trusted Platform Module (TPM) in accordance with a Trusted Computing Platform Alliance (TCPA) compliant computer system.

9. The computer readable medium of claim 8, wherein the ESS includes a plurality of platform configuration registers (PCRs) and the locking instruction (b) further comprises the instructions for:
   (b1) latching the tamper signal in the ESS;
   (b2) hashing the tamper signal to produce a tamper value; and
   (b3) extending the tamper value to one PCR of the plurality of PCRs in the ESS.

10. The computer readable medium of claim 9, wherein the detecting instruction (c) further comprises the instructions for:
    (c1) initiating a platform reset to boot the computer system;
    (c2) resetting all but the one PCRs to zero;
    (c3) hashing code in each device of the plurality of devices booted to produce a measurement value for each device booted;
    (c4) extending the measurement value for each device to an appropriate PCR of the plurality of PCRs; and
    (c5) comparing the measurement value of the one PCR to a precalculated value representing a trustworthy boot.

11. The computer readable medium of claim 10 further comprising the instruction for:
    (d) performing preventative operations to restore trust in the computer system if the measurement value of the one PCR is different from the precalculated value.

12. The computer readable medium of claim 11, wherein the performing instruction (d) further comprises the instruction for:
    (d1) executing a virus protection program.

13. The computer readable medium of claim 11 further comprising the instruction for:
    (e) resetting the one PCR to zero once trust is established in the computer system.

14. The computer readable medium of claim 13, wherein the resetting instruction (e) further includes the instruction for:
  (e1) providing a secure means for resetting the one PCR, whereby only an authorized entity is capable of resetting the one PCR.

15. A system for detecting tamper events the system comprising:
  a tamper detector;
  an embedded security system (ESS) coupled to the tamper detector, the ESS receiving a tamper signal from the tamper detector and locking the tamper signal therein;
  a BIOS; and
  a trusted operating system detecting the tamper signal locked in the ESS after the BIOS progresses through a boot sequence, wherein the ESS comprises a Trusted Platform Module (TPM) in accordance with a Trusted Computing Platform Alliance (TCPA) compliant computer system.

16. The system of claim 15, wherein the ESS includes a plurality of platform configuration registers (PCRs) and locks the tamper signal by hashing the tamper signal to produce a tamper value and extending the tamper value to one PCR of the plurality of PCRs.

17. The system of claim 16, wherein the trusted operating system detects the tamper signal by comparing a measurement value in the one PCR with a precalculated value representing a trustworthy boot following a boot sequence in response to a platform reset, wherein the platform reset resets all but the one PCRs to zero.

18. The system of claim 17, wherein the trusted operating system performs preventative operations to restore trust in the computer system if the measurement value in the one PCR differs from the precalculated value.

19. The system of claim 17, wherein the trusted operating system launches a virus protection program if the measurement value in the one PCR differs from the precalculated value.

20. The system of claim 18, wherein the trusted operating system resets the one PCR to zero once trust is established in the computer system.

21. The system of claim 20 further comprising:
  means for allowing only the trusted operating system to reset the one PCR.

* * * * *